ANHYDRO-5,5'-DICHLORO-3,9-DIETHYL-3'-(3-SULFOBUTYL)-THIACARBOCYANINE HYDROXIDE (=DYE I) PLUS ANHYDRO-9-ETHYL-3'-METHYL-3-(4 SULFOBUTYL)-4,5,4',5'-DIBENZO-6,7-DIHYDRO-THIACARBOCYANINE HYDROXIDE (=DYE A)

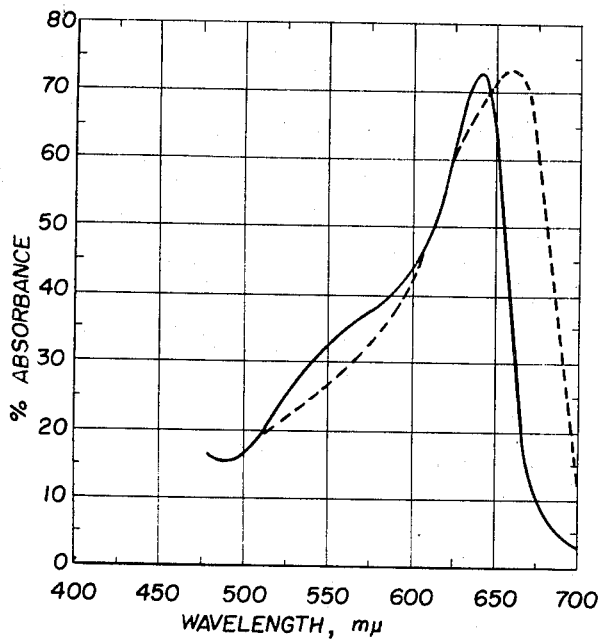

-----

DYE I PLUS 9-ETHYL-3,3'-DIMETHYL-4,5,4',5'-DIBENZOTHIACARBOCYANINE CHLORIDE (=DYE Z)

FIG. 1

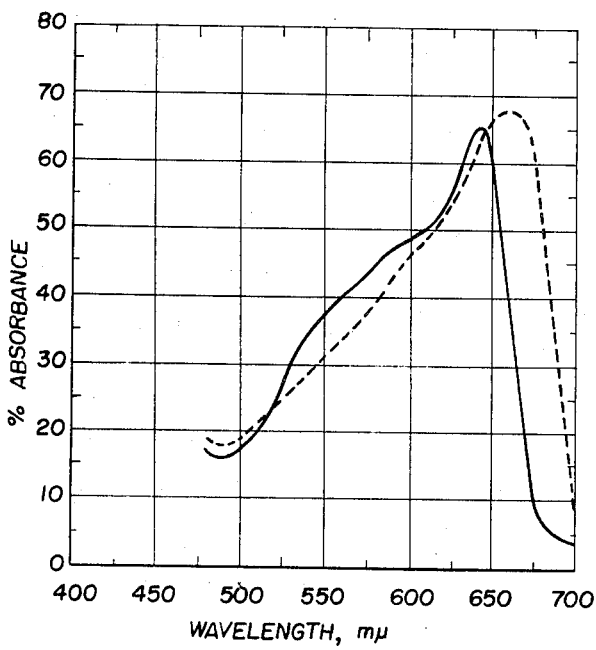

5,5'-DIBROMO-3,3',9-TRIETHYLTHIACARBOCYANINE BROMIDE (=DYE VI) PLUS ANHYDRO-9-ETHYL-3'-METHYL-3-(4-SULFOBUTYL)-4,5,4',5'-DIBENZO-6,7-DIHYDROTHIACARBOCYANINE HYDROXIDE (=DYE A)

-----

DYE VI PLUS 9-ETHYL-3,3'-DIMETHYL-4,5,4',5'-DIBENZOTHIACARBOCYANINE CHLORIDE (=DYE Z)

FIG. 2

NORMAN W. KALENDA
JEAN E. JONES
INVENTORS

BY *R. Frank Smith*
*Ray Carter ...*
ATTORNEY AND AGENT

# United States Patent Office 3,432,303
Patented Mar. 11, 1969

3,432,303
SILVER HALIDE EMULSIONS CONTAINING DYE
COMBINATIONS FOR SUPERSENSITIZATION
Jean E. Jones and Norman W. Kalenda, Rochester, N.Y.,
assignors to Eastman Kodak Company, Rochester, N.Y.,
a corporation of New Jersey
Filed May 24, 1965, Ser. No. 458,068
U.S. Cl. 96—104                                    18 Claims
Int. Cl. G03c 1/28

ABSTRACT OF THE DISCLOSURE

Photographic silver halide emulsions used in photographic elements are advantageously supersensitized by combinations of a cyanine dye, or a carbocyanine dye, or a chain-substituted carbocyanine dye with a 9-substituted dibenzo dihydro thiacarbocyanine dye.

---

This invention relates to photographic silver halide emulsions containing simple cyanines, carbocyanine and chain-substituted carbocyanine dyes, and in particular to supersensitizing combinations therewith of certain 9-substituted carbocyanine dyes.

It is known in the art of making photographic emulsions that certain dyes of the cyanine class alter the sensitivity of photographic emulsions of the gelatino-silver-halide kind, when the dyes are incorporated in the emulsions. It is also known that the sensitization produced by a given dye varies somewhat with the type of emulsion in which the dye is incorporated. Furthermore, the sensitization of a given emulsion by a given dye may be altered by varying the conditions in the emulsion. For example, the sensitization may be increased by increasing the silver ion concentration or decreasing the hydrogen ion concentration (i.e., increasing the alkalinity), or both. Thus, sensitization can be increased by bathing plates, coated with a spectrally sensitized emulsion, in water or in aqueous solutions of ammonia. Such a process of altering the sensitivity of a sensitized emulsion by increasing the silver ion concentration and/or by decreasing the hydrogen ion concentration is commonly called "hypersensitization." Hypersensitized emulsions have generally poor keeping qualities. Various combinations of two or more sensitizing dyes have also been proposed to alter the sensitivity of such emulsions.

We have now found that certain simple cyanine, carbocyanine and chain-substituted carbocyanine dyes in combination with certain 9-substituted carbocyanine dyes derived from a 4,5-dihydronaphtho [1,2-d]thiazole nucleus or a 4,5-dihydronaphtho-[1,2-d]selenazole nucleus, not only improve the sensitivity of silver halide emulsions, but in addition sensitize the emulsions to shorter wavelengths in the red region of the spectrum as compared with the sensitization obtained with similar combinations containing only the non-hydrogenated forms of the said 9-substituted carbocyanine dyes. Silver halide emulsions containing our new dye combinations, which are designated hereinafter as supersensitizing combinations, are of particular utility in certain color materials.

It is, therefore, an object of the invention to provide photographic silver halide emulsions containing certain cyanine, carbocyanine and chain-substituted carbocyanine dyes and in combination therewith, certain 9-substituted carbocyanine dyes, derived from a 4,5-dihydronaphtho [1,2-d]thiazole nucleus or a 4,5-dihydronaphtho [1,2-d] selenazole nucleus, that are particularly useful in applications where for good color reproduction the required sensitization does not extend too far into the red region of the spectrum. Another object is to provide photographic silver halide emulsions of the above kind having maximum red sensitivity at wavelengths shorter by about from 15–20 m$\mu$, as compared with the same emulsions containing in combination only the non-hydrogenated forms of the said 9-substituted carbocyanine dyes. Another object is to provide means for preparing such super-sensitized emulsions. Other objects will become apparent from a consideration of the description and examples.

The cyanine, carbocyanine and chain-substituted carbocyanine dyes useful in practicing our invention include those dyes represented by the following general formula:

I

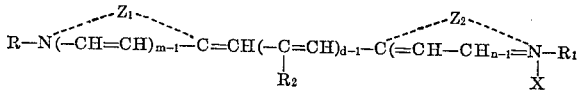

wherein $d$, $m$ and $n$ each represents an integer of from 1 to 2, R and $R_1$ each represents the same or different alkyl group (e.g., methyl, benzyl, ethyl, sulfoethyl, carboxyethyl, hydroxyethyl, methoxyethyl, phenethyl, carboxypropyl, butyl, sulfobutyl, hydroxybutyl, methoxybutyl, hexyl, ethoxyoctyl, sulfodecyl, carboxydecyl, dodecyl, etc.), $R_2$ represents the hydrogen atom, an alkyl group (e.g., methyl, ethyl, propyl, isopropyl, butyl, amyl, etc.), an aryl group (e.g., phenyl, tolyl, etc.), or a heterocyclic group (e.g., 2-thienyl, 2-pyrryl, 3-pyrryl, 2-indolyl, 3-indolyl, 3-pyridyl, 4-pyridyl, etc.), X represents an acid anion (e.g., chloride, bromide, iodide, thiocyanate, sulfamate, perchlorate, methyl sulfate, ethyl sulfate, p-toluenesulfonate, etc.), and $Z_1$ and $Z_2$ each represents the non-metallic atoms required to complete a heterocyclic nucleus having from 5 to 6 atoms in the heterocyclic ring, including nuclei, such as, a thiazole nucleus (e.g., thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, etc.), a benzothiazole nucleus (e.g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.), a naphthothiazole nucleus (e.g., α-naphthothiazole, β,β-naphthothiazole, β-naphthothiazole, 5-methoxy-β-naphthothiazole, 5-ethoxy-β-naphthothiazole, 8-methoxy-α-naphthothiazole, 7-methoxy-α-naphthothiazole, etc.), a thianaphtheno-7',6',4,5-thiazole nucleus (e.g., 4'-methoxy-thianaphtheno-7',6',4,5-thiazole, etc.), an oxazole nucleus (e.g., 4-methyloxazole, 5-methyloxazole, 4-phenyloxazole, 4,5-diphenyloxazole, 4-ethyloxazole, 4,5-dimethyloxazole, 5-phenyloxazole, etc.), a benzoxazole nucleus (e.g., benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 6-chlorobenzoxazole, 6-methoxybenzoxazole, 5-hydroxybenzoxazole, 6-hydroxybenzoxazole, etc.), a naphthoxazole nucleus (e.g., α-naphthoxazole, β,β-naphthoxazole, β-naphthoxazole, etc.), a selenazole nucleus (e.g., 4-methyl-selenazole, 4-phenylselenazole, etc.), a benzoselenazole nucleus (e.g., benzoselenazole, 5-chlorobenzoselenazole, 5-methoxybenzoselenazole, 5 - hydroxybenzoselenazole, tetrahydrobenzoselenazole, etc.), a naphthoselenazole nucleus (e.g., α-naphthoselenazole, β,β-naphthoselenazole, β-naphthoselenazole, etc.), a thiazoline nucleus (e.g., thiazoline, 4-methylthiazoline, etc.), a 2-quinoline nucleus (e.g., 2-quinoline, 3-methyl-2-quinoline, 5-methyl-2-quinoline, 7-methyl-2-quinoline, 8-methyl-2-quinoline, 6-chloro-2-quinoline, 8-chloro-2-quinoline, 6-methoxy-2-quinoline, 6-ethoxy-2-quinoline, 6-hydroxy-2-quinoline, 8-hydroxy-2-quinoline, etc.), a 4-quinoline nucleus (e.g., 4-quinoline, 6-methoxy-4-quinoline, 7-methyl-4-quinoline, 8-methyl-4-quinoline, etc.), a 1-isoquinoline nucleus (e.g., 1-isoquinoline, 3,4-dihydro-1-isoquinoline, etc.), a 3-isoquinoline nucleus (e.g., 3-isoquinoline, etc.), a 3,3-dialkylindolenine nucleus (e.g., 3,3-dimethylindolenine, 3,3,5-trimethylindolenine, 3,3,7-trimethylindolenine, etc.), a 2-pyridine nucleus (e.g., 2-pyridine, 3-methyl-2-pyridine, 4-methyl-2-pyridine, 5-methyl-2-pyridine, 3,4-dimethyl - 2-pyridine, 4-chloro-2-pyridine, 3-hydroxy - 2-pyridine, 3-phenyl - 2-pyridine, etc.), a 4-pyridine nucleus (e.g., 2-methyl-4-pyridine, 3-methyl-4-pyridine, 3-chloro-4-pyridine, 2,6-dimethyl-4-pyridine, 3-hydroxy-4-pyridine, etc.), a 1-alkylimidazole nucleus (e.g., 1-methylimidazole, 1-ethyl - 4-phenylimidazole, 1-butyl - 4,5-dimethylimidazole, etc.), a 1-alkylbenzimidazole nucleus (e.g., 1-methylbenzimidazole, 1-butyl-4-methylbenzimidazole, 1-ethyl-5,6-dichlorobenzimidazole, etc.), a 1-alkylnaphthimidazole series (e.g., 1-ethyl-alpha-naphthimidazole, 1-methyl-beta-naphthimidazole, etc.), and the like nuclei.

The dyes used to advantage in practicing our invention include those represented by the following formula:

II.

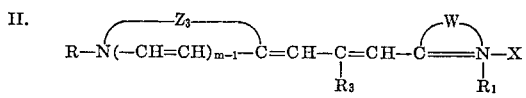

wherein R, $R_1$, $m$ and X are as described previously, $R_3$ represents an alkyl group (e.g., methyl, ethyl, butyl, amyl, etc.), an aryl group (e.g., phenyl, tolyl, etc.), or a heterocyclic group (e.g., 2-thienyl, 2-pyrryl, 3-pyrryl, 2-indolyl, 3-indolyl, 2-pyridyl, 3-pyridyl, etc.); and W represents the non-metallic atoms required to complete a nucleus, such as, a 4,5-dihydronaphtho [1,2-d]thiazole nucleus, (e.g., 4,5-dihydronaphtho-[1,2-d]thiazole, 6-ethyl - 4,5-dihydronaphtho[1,2-d]thiazole, 7-phenyl - 4,5 - dihydronaphtho[1,2-d]thiazole, 8 - chloro - 4,5 - dihydronaphtho[1,2-d]thiazole, 6-cyano - 4,5-dihydronaphtho[1,2-d]thiazole, 6-sulfo - 4,5 - dihydronaphtho-[1,2-d]thiazole, 8-amino - 4,5-dihydronaphtho[1,2-d]thiazole, etc.), a 4,5-dihydronaphtho[1,2-d]selenazole nucleus (e.g., 4,5-dihydronaphtho[1,2-d]selenazole, 6-chloro - 4,5-dihydronaphtho[1,2-d]selenazole, 7-sulfo - 4,5 - dihydronaphthol[1,2-]selenazole, 8-cyano - 4,5 - dihydronaphtho[1,2-d] selenazole, 7-acetoxy - 4,5-dihydronaphtho[1,2-d]selenazole, 7-ethyl-4,5-dihydronaphtho[1,2-d]selenazole, etc.); and $Z_3$ represents the non-metallic atoms required to complete a heterocyclic nucleus having from 5 to 6 atoms in the heterocyclic ring including the heterocyclic nuclei described previously for $Z_1$ and $Z_2$.

Included among the 9-substituted dibenzodihydrothiacarbocyanine dyes of Formula II that are particularly useful in practicing our invention are those represented to advantage by the following formula:

III.

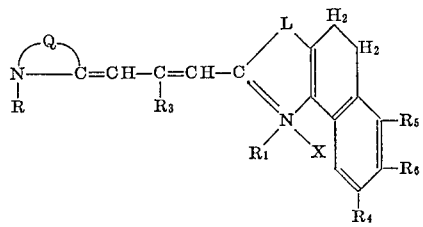

wherein R, $R_1$, $R_3$ and X are as previously defined, and $R_4$, $R_5$ and $R_6$ each represents a group, e.g., hydrogen, lower alkyl (e.g., methyl, ethyl, butyl, etc.), lower alkoxy (e.g. methoxy, propoxy, butoxy, etc.) aryl (e.g., phenyl, tolyl, etc.), halogen (e.g., chlorine, bromine etc.), sulfo (including alkali metal and ammonium salts thereof), a carboxy group (including the alkali metal and ammonium salts thereof), the cyano group, an alkoxycarbonyl group having from 2 to 10 carbon atoms (e.g., methoxycarbonyl, butoxycarbonyl, decoxycarbonyl, etc.), etc., and an acetoxy group, and Q represents the non-metallic atoms required to complete a nucleus, such as, a 4,5-dihydronaphtho[1,2-d]thiazole nucleus (e.g., 4,5-dihydronaphtho [1,2 - d]thiazole, 6 - ethyl-4,5-dihydronaphtho[1,2-d]thiazole, 7-phenyl-4,5-dihydronaphtho[1,2-d]thiazole, 8-chloro - 4,5-dihydronaphtho[1,2-d]thiazole, 6-cyano-4,5-dihydronaphtho[1,2 - d]thiazole, 6-sulfo-4,5-dihydronaphtho-[1,2-d]thiazole, 7-acetoxy-4,5-dihydronaphtho[1,2-d]thiazole, 8-amino-4,5-dihydronaphtho[1,2-d]thiazole, etc.), a 4,5-dihydronaphtho[1,2-d]selenazole nucleus (e.g., 4,5-dihydronaphtho[1,2 - d]selenazole, 6 - chloro-4,5-dihydronaphtho[1,2 - d]selenazole, 7 - sulfo-4,5-dihydronaphtho[1,2 - d]selenazole, 8 - cyano-4,5-dihydronaphtho[1,2-d]selenazole, 7 - acetoxy - 4,5-dihydronaphtho[1,2-d]selenazole, 7-ethyl-4,5-dihydronaphtho[1,2-d]selenazole, etc.), a naphtho[1,2-d]thiazole nucleus (e.g., naphtho[1,2-d]thiazole, 6-chloronaphtho[1,2-d]thiazole, 7-cyanonaphtho[1,2 - d]thiazole, 8 - methylnaphtho[1,2 - d]thiazole, 7-aminonaptho[1,2 - d]thiazole, etc.), a naphtho[1,2 - d] selenazole nucleus (e.g., naphtho[1,2-d]selenazole, 6-chloronaphtho[1,2 - d]selenazole, 7-cyanonaphtho[1,2-d] selenazole, 7 - cyanonaphtho[1,2 - d]selenazole, 8-aminonaphtho[1,2 - d]selenazole, 6 - sulfonaphtho[1,2-d]selenazole, etc.), and L represents a sulfur atom or a selenium atom.

According to our invention, we incorporate one or more of the cyanine dyes represented by Formula I above with one or more of the holopolar dyes represented by Formula II above. Our invention is particularly directed to the ordinarily employed gelatino-silver-halide developing-out emulsions. However, our supersensitizing combinations can be employed in silver halide emulsions in which the carrier or vehicle is a hydrophilic colloid other than gelatin, such as, for example, albumin, agar-agar, gum arabic, alginic acid, etc., or a hydrophilic resin, such as polyvinyl alcohol, polyvinyl pyrrolidone, a cellulose ether, a partially hydrolyzed cellulose acetate, etc., which has no deleterious effect upon the light-sensitive silver halide.

The dyes of Formula I and Formula II above can be employed in the combinations of the invention in various concentrations depending upon the particular emulsion, concentration of the silver halide, particular results desired, etc.

The optimum concentration of an individual sensitizing dye can be determined in a manner well known to those skilled in the art by measuring the sensitivity of a series of test portions of the same emulsion, each portion containing a different concentration of the sensitizing dye. The optimum concentration of our supersensitizing combinations can, of course, be readily determined in the same manner, by measuring the sensitivity of a series of test portions of the same emulsion, each portion containing different concentrations of the individual dyes in the combination. In determining the optimum concentration for the supersensitizing combination, it is advantageous to employ, at first concentrations of the individual dyes less than their optimum concentrations. The concentrations of the individual dyes can then be increased until the optimum concentration of the supersensitizing combination is determined.

The methods of incorporating sensitizing dyes in silver halide emulsions are well known to those skilled in the art and these known techniques are employed in dispersing the dyes of Formulas I and II above. These dyes can be directly dispersed in the emulsions, or they can first be dissolved in some convenient solvent, such as pyridine, methyl alcohol, acetone, etc. (or mixtures of such solvents), or diluted with water in some instances, and added to the emulsions in the form of these solutions. If desired, the dyes can be separately dissolved in a given solvent and added separately to the emulsion, or they can be dissolved in the same or different solvent and these solutions mixed together before addition is made to the silver halide emulsions. The dyes of Formulas I and II above can also be dispersed in the finished emulsions and should be uniformly distributed throughout the emulsions before the emulsions are coated on a suitable support, such as paper, glass, cellulose ester film, polyvinyl resin film (e.g., polystyrene film, polyvinyl chloride film, etc.), polyester film etc. The following procedure has been found quite satisfactory: Stock solutions of the dyes of Formula I and the dyes of Formula II are prepared by separately dissolving these dyes in appropriate solvents as described above. Then to the flowable silver halide emulsion, the desired amount of stock solution of one of the dyes is slowly added while stirring the emulsion. Stirring is continued until the dye is thoroughly incorporated in the emulsion. Then, the desired amount of stock solution of the other dye is slowly added to the emulsion while stirring. Stirring is continued until the second dye is thoroughly incorporated in the emulsion. The supersensitized emulsions can then be coated on a suitable support and the coating allowed to dry. In some instances, it may be desirable to heat the supersensitized emulsion for a few minutes before coating onto the suitable support. The details of such coating techniques are well known to those skilled in the art. The foregoing procedure and proportions are to be regarded only as illustrative. Clearly, our invention is directed to any silver halide emulsion containing a combination of the aforesaid dyes whereby a supersensitizing effect is obtained.

To different portions of the same batch of photographic gelatino-silver-bromiodide emulsion were added (1) a dye of Formula I, (2) a dye of Formula II and (3) a combination of the dyes of (1) and (2). The emulsions were held for a short time at about 50–52° C., coated on a transparent support, chill set and dried. The coatings were then exposed to daylight quality radiation through either a yellow Wratten No. 16 Filter which transmits substantially no light of wavelength shorter than about 520 m$\mu$ or a red Wratten No. 29 Filter which transmits substantially no light of wavelength shorter than about 610 m$\mu$. The filter was selected to correspond to the maximum sensitizing region of the particular simple cyanine dye illustrated. The exposed coatings were then processed for three minutes in a developer having the following composition:

| | Grams |
|---|---|
| N-methyl-p-aminophenol sulfate | 2.0 |
| Hydroquinone | 8.0 |
| Sodium sulfite (desiccated) | 90.0 |
| Sodium carbonate (monohydrate) | 52.5 |
| Potassium bromide | 5.0 |
| Water to make one liter. | |

The speed, gamma and fog for each of the coatings was then measured. The same emulsion batch was used for the coatings of each example, although not all of the examples used the same emulsion batch.

Included among the dyes of Formula I above are the following typical dye compounds:

| Dye No. | Dye name |
|---|---|
| I | Anhydro-5,5'-dichloro-3,9-diethyl-3'-(3-sulfobutyl)-thiacarbocyanine hydroxide. |
| II | 3,3',9-triethyl-5,5'-dichlorothiacarbocyanine bromide. |
| III | Anhydro-3,3'-di-($\beta$-carboxyethyl)-5,5'-dichloro-9-ethylthiacarbocyanine hydroxide. |
| IV | Anhydro-5,5'-dichloro-9-ethyl-3-methyl-3'-(4-sulfobutyl) thiacarbocyanine hydroxide. |
| V | 5'-chloro-3,3',9-triethylthiacarbocyanine iodide. |
| VI | 5,5'-dibromo-3,3',9-triethylthiacarbocyanine bromide. |
| VII | Anhydro-5,5'-dichloro-9-methyl-3,3'-di(4-sulfobutyl)-thiacarbocyanine hydroxide, sodium salt. |
| VIII | Anhydro-5,5'-dichloro-3-ethyl-9-methyl-3'-(3-sulfobutyl)-thiacarbocyanine hydroxide. |
| IX | 3,3'-dimethyl-9-phenylthiacarbocyanine iodide. |
| X | 3,3'-dimethyl-9-phenyl-4,5,4',5'-dibenzothiacarbocyanine bromide. |
| XI | 3,3'-diethyl-9-phenyloxathiacarbocyanine iodide. |
| XII | 9-ethyl-1,3-dimethylthia-2'-carbocyanine iodide. |
| XIII | 3,3'-diethyl-9-phenyl-4,5-benzothiacarbocyanine chloride. |
| XIV | 3,3,3',3'-tetramethyl-1,1'-diethylindocarbocyanine iodide. |
| XV | 3,3'-diethyl-9-phenyloxacarbocyanine perchlorate. |
| XVI | 1',3-dimethyl-9-phenylthia-2'-carbocyanine iodide. |
| XVII | 3,3'-diethyl-9-phenylselenacarbocyanine bromide. |
| XVIII | 3,3'-dimethyl-9-(2-thienyl)thiacarbocyanine iodide. |
| XIX | 3,3'-dimethyl-9-phenylselenacarbocyanine bromide. |
| XX | 3,3'-diethyl-4,5,4',5'-dibenzothiacyanine iodide. |
| XXI | 1,1'-diethyl-2,2'-cyanine iodide. |
| XXII | 3-methyl-1'-ethylthia-2'-cyanine iodide. |

Included among the dyes of Formula II above are the following typical dye compounds:

| Dye No. | Dye name |
|---|---|
| A | Anhydro-9-ethyl-3'-methyl-3-(4-sulfobutyl)-4,5,4',5'-dibenzo-6,7-dihydrothiacarbocyanine hydroxide. |
| B | 9-ethyl-3,3'-dimethyl-4,5,4',5'-dibenzo-6,7-dihydro-thiacarbocyanine bromide. |
| C | Anhydro-3'-methyl-9-phenyl-3-(4-sulfobutyl)-4,5,4',5'-di(4-chlorobenzo)-6,7-dihydrooxathiacarbocyanine hydroxide. |
| D | Anhydro-3'-methyl-3-(4-sulfobutyl)-9-(2-thienyl)-4,5-(4-methylbenzo)-4',5'-benzo-6,7-dihydrooxathia-carbocyanine hydroxide. |
| E | Anhydro-3-(2-carboxyethyl)-3',9-diethyl-4,5-(3-cyanobenzo)-4',5'-(4-methylbenzo)-6,7-dihydro-imidazolothiacarbocyanine hydroxide. |
| F | Anhydro-3-(2-carboxyethyl)-3',9-diethyl-5,6-(5-amino-benzo)-4',5'-(5-sulfobenzo)-6,7-dihydrothiacarbocyanine hydroxide. |
| G | 9-ethyl-3,3'-dimethyl-4,5,4',5'-dibenzo-6,7,6',7'-tetra-hydroselenacarbocyanine iodide. |
| H | 3,3'-dimethyl-9-(4-pyridyl)-4,5-(4-methoxycarbonylbenzo)-4',5'-(4-phenylbenzo)-6,7-dihydrothiacarbocyanine iodide. |
| I | 9-ethyl-3,3'-diethyl-4,5-benzo-4',5'-(4-sulfobenzo)-6,7,6',7'-tetrahydrothiacarbocyanine iodide. |

The cyanine, carbocyanine and chain-substituted carbocyanine dyes coming within the definition of Formula I above include many well known dyes. Such dyes are disclosed, for example, in Brooker U.S. Patent No. 1,934,657, issued Nov. 7, 1933; Schneider U.S. Patent No. 2,060,382, issued Nov. 10, 1936; Koslowsky U.S. Patent No. 2,107,379, issued Feb. 8, 1938; Brooker et al. U.S. Patent No. 2,112,140, issued Mar. 22, 1938; Kendall U.S. Patent No. 2,310,640, issued Feb. 9, 1943; Keyes U.S. Patent No. 2,486,173, issued Oct. 25, 1949; Heseltine U.S. Patent No. 2,734,900, issued Feb. 14, 1956; Heseltine U.S. Patent No. 2,756,227, issued July 24, 1956, etc.

The dyes coming within the definition of Formula II above are readily prepared by several well known processes for preparing carbocyanine dyes. For example, they may be prepared by condensing a quaternary salt having the following general formula:

IV. 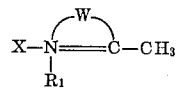

wherein $R_1$, W and X are as previously defined with a ketone having the following general formula:

V. 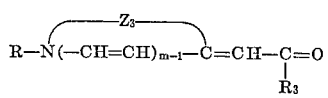

wherein R, $R_3$, $Z_3$ and $m$ are as previously defined in accordance with the process described in Brooker et al.

U.S. Patent No. 2,112,140, issued Mar. 22, 1938, or Kodak Ltd. British Patent No. 466,246, dated May 18, 1937. The intermediate compounds of Formula IV above may be prepared by quaternizing the corresponding hydrogenated products described in Copeland U.S. Patent No. 2,942,002, issued June 21, 1960.

The dyes of Formula III are advantageously prepared by the same method used to prepare the dyes of Formula II but by condensing an intermediate of the formula:

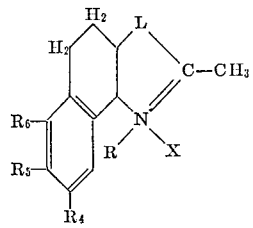

wherein R, $R_4$, $R_5$, $R_6$, L and X are as described previously with a ketone having the formula:

VII. 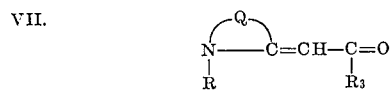

wherein Q, R and $R_3$ are as defined previously. Compounds of Formula VII when Q is the same as W are derived from compounds of Formula IV by well known methods, while the other compounds of Formula VII are well known in the art.

Example 1

A silver bromoiodide emulsion was made of the type described by Trivelli and Smith, Phot. Journal, vol. 79, 330 (1939). The melted emulsion was divided into separate portions to which were added a solution of the dye sensitizers I to VIII, A, B and combinations of each of I to VIII with A or B as indicated in Table 1. Each portion was digested at 50° C. for 10 minutes, coated on a film support and dried. The dried samples were given identical exposure through a Wratten No. 29 Filter on an Eastman Sensitometer (Type 1B) for 1/5 second to a tungsten light source and processed for three minutes in the above mentioned developer solution, fixed in a conventional sodium thiosulfate fixing bath, washed and dried. Densitometric measurements were made of the developed images on each coating. The relative speed values were calculated on an arbitrary relative speed of 100 for the coating sensitized with 0.16 g. of Dye A or of Dye B per mol. of silver halide, and the gamma values determined. These values along with the fog values are shown in Table 1 below.

TABLE 1

| Dye and concentration (g./mol. silver halide) | Relative speed | Gamma | Fog |
|---|---|---|---|
| A (0.16) | 100 | 2.20 | .06 |
| A (0.08)+I (.08) | 145 | 2.24 | .06 |
| A (0.08)+II (0.08) | 132 | 2.30 | .07 |
| A (0.08)+III (0.08) | 151 | 2.28 | .06 |
| I (0.16) | 89 | 2.24 | .06 |
| II (0.16) | 97 | 2.06 | .10 |
| III (0.16) | 126 | 2.30 | .08 |
| B (0.16) | 100 | 2.56 | .06 |
| B (0.08)+I (0.08) | 159 | 2.52 | .06 |
| I (0.16) | 110 | 2.30 | .07 |
| A (0.16) | 100 | 2.32 | .05 |
| A (0.08)+IV (0.08) | 129 | 2.34 | .06 |
| IV (0.16) | 91 | 1.96 | .06 |
| A (0.08)+VI (0.08) | 123 | 2.26 | .06 |
| VI (0.16) | 97 | 2.18 | .08 |
| A (0.08)+VII (0.08) | 118 | 2.30 | .06 |
| VII (0.16) | 100 | 2.40 | .06 |
| B (0.16) | 95 | 2.20 | .06 |
| B (0.08)+VIII (0.08) | 120 | 2.16 | .08 |
| VIII (0.16) | 105 | 2.52 | .06 |
| A (0.16) | 100 | 1.71 | .06 |
| A (0.08)+V (0.08) | 135 | 1.58 | .10 |
| V (0.16) | 89 | 1.61 | .10 |

By reference to the above table, it will be noted that in each case of comparison the supersensitizing combinations were substantially higher in relative speeds than the values shown for the individual dyes.

Example 2

Coatings were made as in Example 1, excepting that Dyes IX and XXII and B, and combinations of each of IX to XXII with B, were employed as indicated in Table 2. These coatings were exposed through the indicated Wratten Filters, processed and densitometric measurements made as described in Example 1. The relative speeds (based on 100 for Dye B), gamma and fog values obtained are listed in the following Table 2.

TABLE 2

| Dye and concentration (g./mol. silver halide) | Wratten No. 16 filter | | |
|---|---|---|---|
| | Relative speed | Gamma | Fog |
| X (.08) | 174 | 1.50 | .05 |
| X (.08)+B (.008) | 347 | 1.40 | .05 |
| X (.08) | 263 | 1.70 | .06 |
| X (.08)+B (.008) | 479 | 1.70 | .06 |
| XI (.08) | 138 | 1.30 | .05 |
| XI (.08)+B (.008) | 347 | 1.50 | .04 |
| XII (.08) | 251 | 1.40 | .04 |
| XII (.08)+B (.008) | 479 | 1.30 | .04 |
| XIII (.08) | 166 | 1.20 | .05 |
| XIII (.08)+B (.008) | 331 | 1.20 | .04 |
| XIV (.08) | 148 | 1.40 | .04 |
| XIV (.08)+B (.008) | 331 | 1.40 | .04 |
| XVII (.08) | 145 | 1.30 | .05 |
| XVII (.08)+B (.008) | 326 | 1.30 | .04 |
| B (.008) | 100 | 1.80 | .04 |
| | Wratten No. 16+ No. 16 filter | | |
| XV (.08) | 45 | 1.50 | .06 |
| XV (.08)+B (.008) | 234 | 1.30 | .06 |
| B (.008) | 100 | 1.80 | .06 |
| | Wratten No. 29 filter | | |
| XVI (.08) | 398 | 1.30 | .04 |
| XVI (.08)+B (.008) | 795 | 1.30 | .04 |
| B (.008) | 100 | 1.70 | .06 |
| | Wratten No. 16 filter | | |
| XVIII (.08) | 76 | 1.32 | .06 |
| XVIII (.08)+B (.008) | 240 | 1.42 | .06 |
| XIX (.08) | 159 | 1.53 | .04 |
| XIX (.08)+B (.008) | 302 | 1.48 | .06 |
| B (.008) | 100 | 1.42 | .05 |
| | Wratten No. 61+ No. 16 filter | | |
| XX (.08) | 87 | 0.86 | .04 |
| XX (.08)+B (.008) | 151 | 1.25 | .04 |
| XXI (.08) | 151 | 1.47 | .06 |
| XXI (.08)+B (.008) | 692 | 1.45 | .05 |
| XXII (.08) | 436 | 1.41 | .06 |
| XXII (.08)+B (.008) | 792 | 1.40 | .04 |
| B (.008) | 100 | 1.62 | .05 |

As shown in the above table, the relative speeds of the supersensitizing combinations are substantially higher in each case of comparison than the values obtained for the individual dyes.

Example 3

This example demonstrates that the supersensitizing combinations of the invention sensitize silver halide emulsions to shorter wavelengths in the red region of the spectrum than do related combinations. Thus, in the following Table 3, a comparison is made of dye combinations of Dyes I and VI with Dye Z (containing the simple non-hydrogenated nuclei, i.e., the dye compound 9-ethyl-3,3'-dimethyl - 4,5,4'5' - dibenzothiacarbocyanine chloride).

Coatings were made as in Example 1. These were exposed, processed and the density measurements made as described in Example 1 except that a Wratten No. 16 Filter was used in place of the Wratten No. 29 Filter.

The relative speeds (based on 100 for Dye I), gammas and fog values are listed in Table 3 below.

TABLE 3

| Dye and Concentration (g./mol. silver halide) | Relative speed | Gamma | Fog |
| --- | --- | --- | --- |
| I (.165) | 100 | 1.06 | .06 |
| I (.082)+A (.082) | 148 | 1.16 | .05 |
| I (.082)+Z (.082) | 123 | 1.12 | .07 |
| VI (.165) | 91 | .94 | .08 |
| VI (.082)+A (.082) | 115 | 1.07 | .07 |
| VI (.082)+Z (.082) | 123 | 1.03 | .08 |
| A (.165) | 95 | 1.24 | .06 |
| Z (.165) | 118 | 1.15 | .08 |

It will be noted from the above table that the sensitizing combinations show in each case of comparison substantially higher relative speeds than do the individual dyes. This is true whether Dye A or Dye Z is used in the combinations. However, the maximum absorbence shows a shift of about 15–20 m$\mu$ to shorter wavelengths in the red region of the spectrum for the dye combinations of the invention as compared with the wavelengths of maximum absorbence for the dye combinations containing Dye Z. The accompanying two drawings illustrate this technical advance produced by the dye combinations of the invention.

In FIGURE 1, the absorbence of the combination of Dye I with Dye A, and comparison combination of Dye I with Dye Z, over a wavelength range of about from 480 m$\mu$ to 700 m$\mu$, are shown in Curves I+A and I+Z. From these curves, it will be noted that the maximum absorbence of the combination of Dye I with Dye A of the invention occurs at a wavelength of about 640 m$\mu$ with about 73% absorbence, while the comparison combination of Dye I with Z occurs at a wavelength of about 658 with about 73% absorbence. The difference in the respective maximum absorbence points is approximately 18 m$\mu$. This divergence continues to a wavelength of approximately 700 m$\mu$ and clearly indicates that the sensitizing combination of Dye I with Dye A of the invention sensitizes silver halide emulsions to shorter wavelengths in the red region of the spectrum as compared with the sensitizing effect produced with comparison sensitizing combination of Dye I with Dye Z.

In FIGURE 2, the absorbence of the combinations of Dye VI with Dye A and comparison combination of Dye VI with Dye Z, over a wavelength range of about from 480 m$\mu$ to 700 m$\mu$, are shown in Curves VI+A and VI+Z. From these curves, it will be noted that the maximum absorbance of the combination of Dye VI with Dye A of the invention occurs at a wavelength of about 640 m$\mu$ with about 65% absorbence, while the comparison combination of Dye VI with Dye Z occurs at a wavelength of about 660 m$\mu$ with about 68% absorbence. The difference in respective maximum absorbence points is approximately 20 m$\mu$. This divergence continues to a wavelength of approximately 700 m$\mu$, and clearly indicates that the sensitizing combination of Dye VI with Dye A of the invention sensitizes silver halide emulsions to shorter wavelengths in the red region of the spectrum as compared with the sensitizing effect produced with comparison sensitizing combination of Dye VI with Dye Z.

The invention has been described in detail with particular reference to preferred embodiments thereof but it will be understood that variations and modifications can be effected within the spirit and scope of the invention as described hereinabove and as defined in the appended claims.

We claim:

1. A photographic silver halide emulsion containing a supersensitizing combination of:
   (1) a dye (a) having the formula:

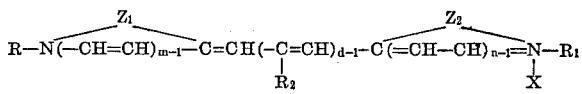

and (2) a dye (b) having the formula:

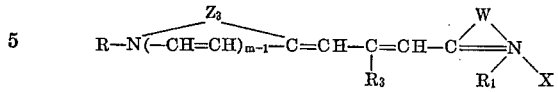

wherein $d$, $m$ and $n$ each represents an integer of from 1 to 2; R and $R_1$ each represents an alkyl group; $R_2$ represents a member selected from the class consisting of an alkyl group, an aryl group, a thienyl group, a pyrryl group, and an indolyl group; $R_3$ represents an alkyl group of 1 to 5 carbon atoms; X represents an acid anion; $Z_1$ and $Z_2$ each represents the nonmetallic atoms required to complete a heterocyclic nucleus having from 5 to 6 atoms in the heterocyclic ring selected from the class consisting of a thiazole nucleus, a benzothiazole nucleus, a naphthothiazole nucleus, a thianaphtheno-7',6',4,5-thiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, a 2-quinoline nucleus, a 4-quinoline nucleus, a 1-isoquinoline nucleus, a 3-isoquinoline nucleus, a 3,3-dialkylindolenine nucleus, a 2-pyridine nucleus, a 4-pyridine nucleus, a 1-alkylimidazole nucleus, a 1-alkylbenzimidazole nucleus and a 1-alkylnaphthimidazole nucleus, $Z_3$ represents the nonmetallic atoms required to complete a heterocyclic nucleus selected from the class consisting of a 4,5-dihydronaphtho[1,2-d]-thiazole nucleus and a naphtho[1,2-d]thiazole nucleus, and W represents the nonmetallic atoms required to complete a 4,5-dihydronaphtho[1,2-d]thiazole nucleus.

2. A photographic silver halide emulsion containing a supersensitizing combination of:
   (1) a dye (a) having the formula:

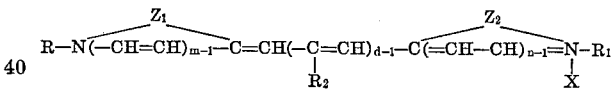

and (2) a dye (b) having the formula:

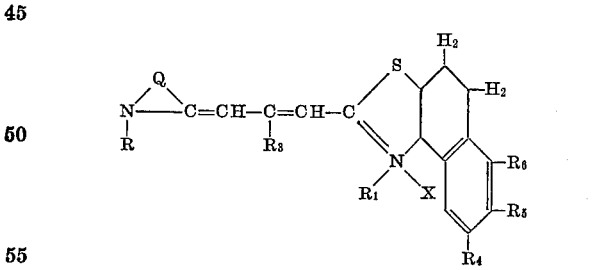

wherein $d$, $m$ and $n$ each represents an integer of from 1 to 2; R and $R_1$ each represents an alkyl group; $R_2$ represents a member selected from the class consisting of an alkyl group, an aryl group, a thienyl group, a pyrryl group, and an indolyl group; $R_3$ represents an ethyl group; $R_4$, $R_5$ and $R_6$ each represents a member selected from the class consisting of hydrogen, lower alkyl, lower alkoxy, aryl, halogen, sulfo, carboxy, cyano, alkoxycarbonyl having from 2 to 10 carbon atoms and acetoxy; X represents an acid anion; $Z_1$ and $Z_2$ each represents the nonmetallic atoms required to complete a heterocyclic nucleus selected from the class consisting of a thiazole nucleus, a benzothiazole nucleus, a naphthothiazole nucleus, a thianaphtheno-7',6',4,5-thiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, a 2-quinoline nucleus, a 4-quinoline nucleus, a 1-isoquinoline nucleus, a 3-isoquinoline nucleus, a 3,3-dialkylindolenine nucleus, a 2-pyridine nucleus, a 4-pyridine nucleus, a 1-alkylimidazole nucleus, a 1-alkylbenzimidazole nucleus, and a 1-alkylnaphthimidazole nucleus; Q represents the nonmetallic atoms required to complete a naphtho[1,2-d]-thiazole nucleus.

3. A photographic element comprising a support coated with at least one layer containing a photographic silver halide emulsion containing a supersensitizing combination of:

(1) a dye (a) having the formula:

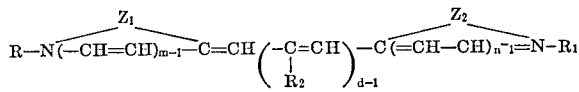

and (2) a dye (b) having the formula:

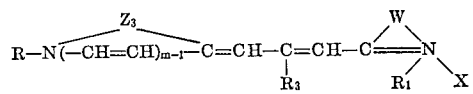

wherein $d$, $m$, and $n$ each represents an integer of from 1 to 2; R and $R_1$ each represents an alkyl group; $R_2$ represents a member selected from the class consisting of an alkyl group, an aryl group, a thienyl group, a pyrryl group, and an indolyl group; $R_3$ represents an alkyl group of 1 to 5 carbon atoms; X represents an acid anion; $Z_1$ and $Z_2$ each represents the nonmetallic atoms required to complete a heterocyclic nucleus having from 5 to 6 atoms in the heterocyclic ring selected from the class consisting of a thiazole nucleus, a benzothiazole nucleus, a naphthothiazole nucleus, a thianaphtheno-7',6',4,5-thiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, a 2-quinoline nucleus, a 4-quinoline nucleus, a 1-isoquinoline nucleus, a 3-isoquinoline nucleus, a 3,3-dialkylindolenine nucleus, a 2-pyridine nucleus, a 4-pyridine nucleus, a 1-alkylimidazole nucleus, a 1-alkylbenzimidazole nucleus and a 1-alkylnaphthimidazole nucleus, $Z_3$ represents the nonmetallic atoms required to complete a heterocyclic nucleus selected from the class consisting of a 4,5-dihydronaphtho[1,2-d]thiazole nucleus and a naphtho[1,2-d]thiazole nucleus, and W represents the nonmetallic atoms required to complete a 4,5-dihydronaphtho[1,2-d]thiazole nucleus.

4. A photographic element comprising a support coated with at least one layer containing a photographic silver halide emulsion containing a supersensitizing combination of:

(1) a dye (a) having the formula:

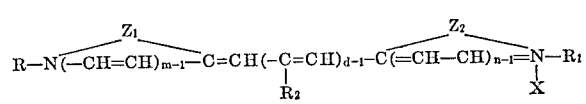

and (2) a dye (b) having the formula:

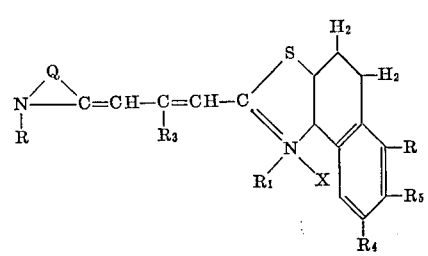

wherein $d$, $m$ and $n$ each represents an integer of from 1 to 2; R and $R_1$ each represents an alkyl group; $R_2$ represents a member selected from the class consisting of an alkyl group, an aryl group, a thienyl group, a pyrryl group, and an indolyl group; $R_3$ represents an ethyl group; $R_4$, $R_5$ and $R_6$ each represents a member selected from the class consisting of hydrogen, lower alkyl, lower alkoxy, aryl, halogen, sulfo, carboxy, cyano, alkoxycarbonyl having from 2 to 10 carbon atoms and acetoxy- X represents an acid anion; $Z_1$ and $Z_2$ each represents the nonmetallic atoms required to complete a heterocyclic nucleus selected from the class consisting of a thiazole nucleus, a benzothiazole nucleus, a naphthothiazole nucleus, a thianaphtheno-7',6',4,5-thiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, a 2-quinoline nucleus, a 4-quinoline nucleus, a 1-isoquinoline nucleus, a 3-isoquinoline nucleus, a 3,3-dialkylindolenine nucleus, a 2-pyridine nucleus, a 4-pyridine nucleus, a 1-alkylimidazole nucleus, a 1-alkylbenzimidazole nucleus, a 1-alkylnaphthimidazole nucleus; Q represents the nonmetallic atoms required to complete a naphtho[1,2-d]-thiazole nucleus.

5. A photographic silver halide emulsion containing a supersenitizing combination of claim 2 in which said dye (b) is anhydro-9-ethyl-3'-methyl-3-(4-sulfobutyl)-4,5,4',5',-dibenzo-6,7-dihydrothiacarbocyanine hydroxide.

6. A photographic silver halide emulsion containing a supersensitizing combination of claim 2 in which said dye (b) is 9-ethyl-3,3'-dimethyl-4,5,4',5',-dibenzo-6,7-dihydrothiacarbocyanine bromide.

7. A photographic element of claim 2 containing as dye (b) anhydro-9-ethyl-3' - methyl - 3 - (4 -sulfobutyl)-4,5,4',5',-dibenzo-6,7-dihydrothiacarbocyanine hydroxide 8. A photographic element of claim 2 containing as dye (b) 9-ethyl-3,3-dimethyl-4,5,4',5',-dibenzo-6,7-dihydrothiacarbocyanine bromide.

9. A photographic silver halide emulsion containing a supersensitizing combination of 3,3'-diethyl-9-phenylselenacarbocyanine bromide with 9-ethyl-3,3'-dimethyl-4,5,4',5',-dibenzo-6,7-dihydrothiacarbocyanine bromide.

10. A photographic silver halide emulsion containing a supersensitizing combination of 1,1'-diethyl-2,2'-cyanine iodide with 9-ethyl-3,3'-dimethyl - 4,5,4',5' - dibenzo-6,7-dihydrothiacarbocyanine bromide.

11. A photographic silver halide emulsion containing a supersensitizing combination of anhydro-5,5'-dichloro-3,9-diethyl-3'-(3-sulfobutyl)-thiacarbocyanine hydroxide with anhydro - 9 - ethyl - 3' - methyl - 3 - (4 - sulfobutyl)-4,5,4',5',-dibenzo-6,8-dihydrothiacarbocyanine hydroxide.

12. A photographic silver halide emulsion containing a supersensitizing combination of anhydro-5,5'-dichloro-3,9-diethyl-3'-(3-sulfobutyl)-thiacarbocyanine hydroxide with 9-ethyl-3,3' - dimethyl - 4,5,4',5' - dibenzo-6,7 - dihydrothiacarbocyanine bromide.

13. A photographic silver halide emulsion containing a supersensitizing combination of 5,5'-dibromo-3,3',9-triethylthiacarbocyanine iodide with anhydro-9-ethyl-3'-methyl-3-(4 - sulfobutyl) - 4,5,4',5' - dibenzo - 6,7 - dihydrothiacarbocyanine hydroxide.

14. A photographic element comprising a support coated with at least one layer containing a photographic silver halide containing a supersensitizing combination of 3,3'-diethyl-9-phenylselenacarbocyanine bromide with 9-ethyl-3,3'-dimethyl-4,5,4',5' - dibenzo-6,7 - dihydrothiacarbocyanine bromide.

15. A photographic element comprising a support coated with at least one layer containing a photographic silver halide containing a supersensitizing combination of 1,1'-diethyl-2,2'-cyanine iodide with 9-ethyl-3,3'-dimethyl-4,5,4',5'-dibenzo - 6,7 - dihydrothiacarbocyanine bromide.

16. A photographic element comprising a support coated with at least one layer containing a photographic silver halide containing a supersensitizing combination of anhydro-5,5'-dichloro - 3,9 - diethyl - 3' - (3 - sulfobutyl)-thiacarbocyanine hydroxide with anhydro-9-ethyl-3'-methyl-3-(4-sulfobutyl) - 4,5,4',5' - dibenzo-6,7 - dihydro-thiacarbocyanine hydroxide.

17. A photographic element comprising a support coated with at least one layer containing a photographic silver halide containing a supersensitizing combination of anhydro-5,5'-dichloro-3,9-diethyl-3'-(3-sulfobutyl)-thiacarbocyanine hydroxide with 9-ethyl-3,3'-dimethyl-4,5,4',5',-dibenzo-6,7-dihydrothiacarbocyanine bromide.

18. A photographic element comprising a support coated with at least one layer containing a photographic silver halide containing a supersensitizing combination of 5,5'-dibromo-3,3',9-triethylthiacarbocyanine iodide with anhydro-9-ethyl-3'-methyl-3-(4-sulfobutyl)-4,5,4',5'-dibenzo-6,7-dihydrothiacarbocyanine hydroxide.

References Cited

UNITED STATES PATENTS

| | | | |
|---|---|---|---|
| 2,704,714 | 3/1955 | Carroll et al. | 96—104 |
| 2,704,715 | 3/1955 | Carroll et al. | 96—104 |
| 2,704,720 | 3/1955 | Jones | 96—104 |

J. TRAVIS BROWN, *Primary Examiner.*

PO-1050
(5/69)

UNITED STATES PATENT OFFICE
CERTIFICATE OF CORRECTION

Patent No. 3,432,303          Dated    March 11, 1969

Inventor(s)   Jean E. Jones and Norman W. Kalenda

It is certified that error appears in the above-identified patent and that said Letters Patent are hereby corrected as shown below:

Column 11, lines 60 through 70, in the structural formula, that part of the structure that reads:

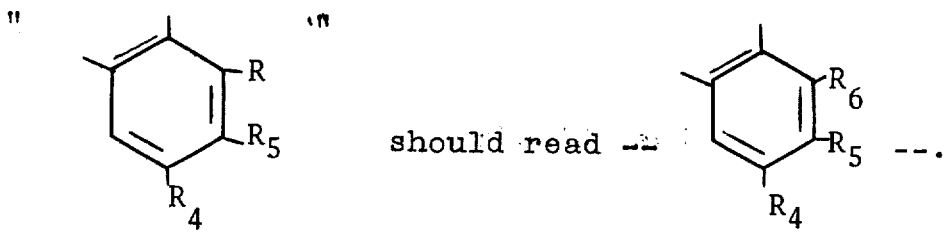

Column 12, line 4, after the word "acetoxy" delete the "-" and substitute in its place --;--; and line 30 after the word "hydroxide" insert --.--.

SIGNED AND
SEALED
JAN 27 1970

(SEAL)
Attest:

Edward M. Fletcher, Jr.                    WILLIAM E. SCHUYLER, JR.
Attesting Officer                          Commissioner of Patents